United States Patent
Wu et al.

(10) Patent No.: US 10,212,643 B2
(45) Date of Patent: Feb. 19, 2019

(54) TRANSMISSION METHOD, WIRELESS COMMUNICATION SYSTEM, AND COMPUTER SYSTEM

(71) Applicants: LITE-ON ELECTRONICS (GUANGZHOU) LIMITED, Guangzhou (CN); LITE-ON TECHNOLOGY CORPORATION, Taipei (TW)

(72) Inventors: Chia-Ching Wu, New Taipei (TW); Kuang-Yao Liao, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/694,364

(22) Filed: Sep. 1, 2017

(65) Prior Publication Data
US 2018/0199260 A1    Jul. 12, 2018

(30) Foreign Application Priority Data
Jan. 6, 2017    (CN) .......................... 2017 1 0011194

(51) Int. Cl.
*H04W 4/00* (2018.01)
*H04W 40/24* (2009.01)
*H04W 4/08* (2009.01)
*H04W 88/08* (2009.01)

(52) U.S. Cl.
CPC ........... *H04W 40/244* (2013.01); *H04W 4/08* (2013.01); *H04W 88/08* (2013.01)

(58) Field of Classification Search
CPC ...... H04W 40/244; H04W 4/08; H04W 88/08
USPC ......................................... 370/328
See application file for complete search history.

(56) References Cited

U.S. PATENT DOCUMENTS

| | | | |
|---|---|---|---|
| 2013/0235813 A1* | 9/2013 | Segev | H04W 72/044 370/329 |
| 2015/0105099 A1* | 4/2015 | Luo | H04W 64/003 455/456.1 |
| 2016/0286349 A1* | 9/2016 | Borghei | H04W 4/021 |

* cited by examiner

*Primary Examiner* — Huy C Ho
(74) *Attorney, Agent, or Firm* — Li & Cai Intellectual Property (USA) Office (57) ABSTRACT

A transmission method is applied to a wireless communication system including at least one wireless access point device and a plurality of mobile devices, each mobile device correspondingly generating a first package. The transmission method includes: the wireless access point device receiving a part of the first packages of the mobile devices; the wireless access point device broadcasting a second package to the plurality of mobile devices; and each mobile device being sorted to a first group mobile device or a second group mobile device according to the second package, the first group mobile device stopping transmission of the first package to the wireless access point device and the second group mobile device continuously transmitting the first package within a time period after broadcasting the second package.

8 Claims, 6 Drawing Sheets

TRANSMISSION METHOD, WIRELESS COMMUNICATION SYSTEM, AND COMPUTER SYSTEM

FIELD OF THE INVENTION

The present disclosure relates to a transmission method, wireless communication system and computer system for increasing a rate of receiving packages, especially to a transmission method, wireless communication system and computer system for increasing a rate of receiving a plurality of beacons corresponding to a plurality of mobile devices in a particular area.

BACKGROUND OF THE INVENTION

In theory, a beacon receiver may receive infinite beacons simultaneously, but this is not the case in actual application. When a large number of beacons (for example, a plurality of mobile devices and/or a plurality of wearable devices) are transmitted simultaneously in an area, the receiver, such as a wireless access point device, will randomly lose some beacons or receive the same beacons repeatedly. Therefore, a wireless communication system and transmission method thereof is needed to decrease the instances of beacons being lost or repeatedly received.

SUMMARY OF THE INVENTION

The present disclosure provides a transmission method, wireless communication system and computer system for increasing a rate of receiving packages, which may effectively decrease the instances of beacons being repeatedly received and increase the rate of beacons being successfully received.

An embodiment of the present disclosure provides a transmission method for a wireless communication system, the wireless communication system includes at least one wireless access point device and a plurality of mobile devices, each mobile device correspondingly generates a first package, the transmission method includes: receiving a part of the plurality of first packages of the plurality of mobile devices by the wireless access point device; broadcasting a second package to the plurality of mobile devices by the wireless access point device according to the part of the plurality of first packages received by the wireless access point device; sorting each mobile device to a first group mobile device or a second group mobile device according to the second package; and within a time period after the second package has been broadcasted, stopping the transmission of the first package to the wireless access point device by the first group mobile device and transmitting the first package to the wireless access point device continuously by the second group mobile device. Each of the first packages corresponds to a position information of each of the mobile devices, the second package corresponds to a received information of the first package received by the wireless access point device, the first group mobile device represents that the first package of the mobile device has been received by the wireless access point device, and the second group mobile device represents that the first package of the mobile device has not been received by the wireless access point device.

Another embodiment of the present disclosure embodiment provides a wireless communication system including: a plurality of mobile devices, each of the mobile devices correspondingly generating a first package; and at least one wireless access point device receiving a part of the plurality of first packages of the plurality of mobile devices, and broadcasting a second package to the plurality of mobile devices. Each of the mobile devices is sorted to a first group mobile device or a second group mobile device according to the second package, and within a time period after the second package has been broadcasted, the first group mobile device stops transmitting the first package to the wireless access point device, and the second group mobile device continuously transmits the first package to the wireless access point device. Each of the first packages corresponds to a position information of each of the mobile device, the second package corresponds to a received information of the first package received by the wireless access point device, the first group mobile device represents that the first package of the mobile device has been received by the wireless access point device, and the second group mobile device represents that the first package of the mobile device has not been received by the wireless access point device.

Another embodiment of the present disclosure embodiment provides a computer system coupled to a wireless communication system, the wireless communication system includes at least one wireless access point device and a plurality of mobile devices, each mobile device correspondingly generating a first package. The computer system includes: a central processing unit; and a storage device coupled to the central processing unit to store a code, the code controlling the central processing unit to perform a transmission method for the wireless communication system. The transmission method includes: receiving a part of the plurality of first packages of the plurality of mobile devices by the wireless access point device; broadcasting a second package to the plurality of mobile devices by the wireless access point device according to the part of the plurality of first packages received by the wireless access point device; sorting each mobile device to a first group mobile device or a second group mobile device according to the second package; and within a time period after the second package has been broadcasted, stopping transmission of the first package to the wireless access point device by the first group mobile device and transmitting the first package to the wireless access point device continuously by the second group mobile device. Each of the first packages corresponds to a position information of each of the mobile devices, the second package corresponds to a received information of the first package received by the wireless access point device, the first group mobile device represents that the first package of the mobile device has been received by the wireless access point device, and the second group mobile device represents that the first package of the mobile device has not been received by the wireless access point device.

The present disclosure provides a transmission method, wireless communication system and computer system increasing the rate of receiving packages, which may efficiently decrease the instances of beacons being lost or repeatedly received, and increase the rate and accuracy of receiving a plurality of beacons of a plurality of mobile devices in a particular area.

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a transmission method, a wireless communication system, and a computer system according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

Figure 1:
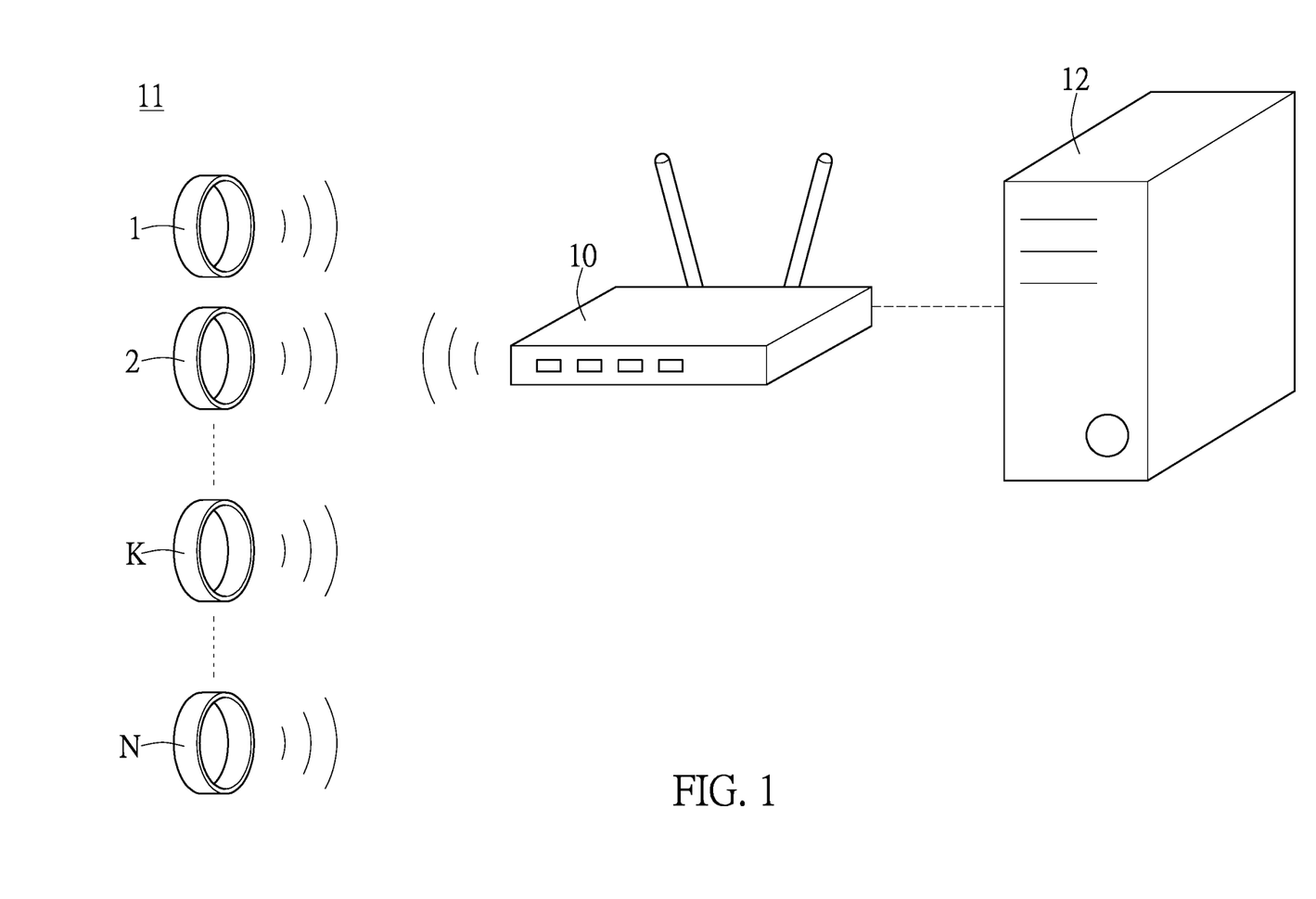
FIG. 1 shows a diagram of a wireless communication system according to an embodiment of the present disclosure.
Figure 2:
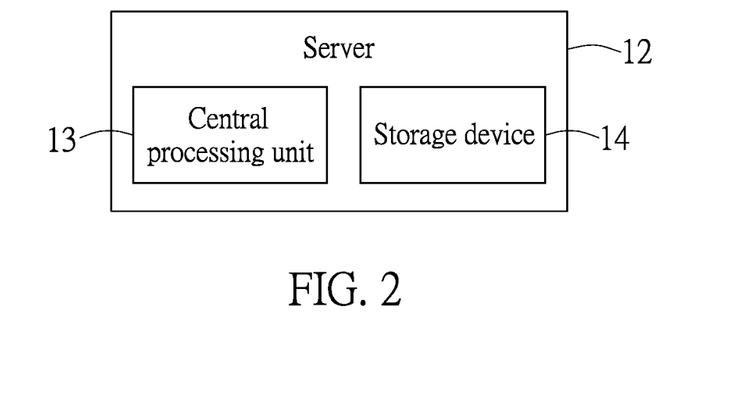
FIG. 2 shows a diagram of a server according to an embodiment of the present disclosure.

Please refer to FIG. 1, in which a wireless communication system 11 of the present disclosure includes mobile devices 1, 2, . . . N, a wireless access point device 10 and a server 12. The mobile devices 1, 2, . . . N include appropriate logic, circuit and code to transmit a plurality of first packages. N is an integer greater than 1, the first package is a beacon, and each first package corresponds to a position information of each mobile device. The mobile devices 1, 2, . . . N in the embodiment may be smart watches, sports bracelets, smartphones, tablets, and the like. In the embodiment, the mobile devices 1, 2, . . . N have been shown as bracelets, but should not be construed as limiting the scope of the present disclosure. The wireless access point device 10 includes appropriate logic, circuit and code to receive the plurality of first packages transmitted by the mobile devices 1, 2 . . . N, and the wireless access point device 10 in the embodiment may also be a base station or other network routing devices. The server 12 includes appropriate logic, circuit and code to be connected with the wireless access point device 10, and as shown in FIG. 2, the server 12 in the embodiment may be a computer system and include a central processing unit 13 and a storage device 14. The storage device 14 is coupled to the central processing unit 13 to store a code, and the code controls the central processing unit 13 to perform a transmission method for the wireless communication system 11.

Figure 3:
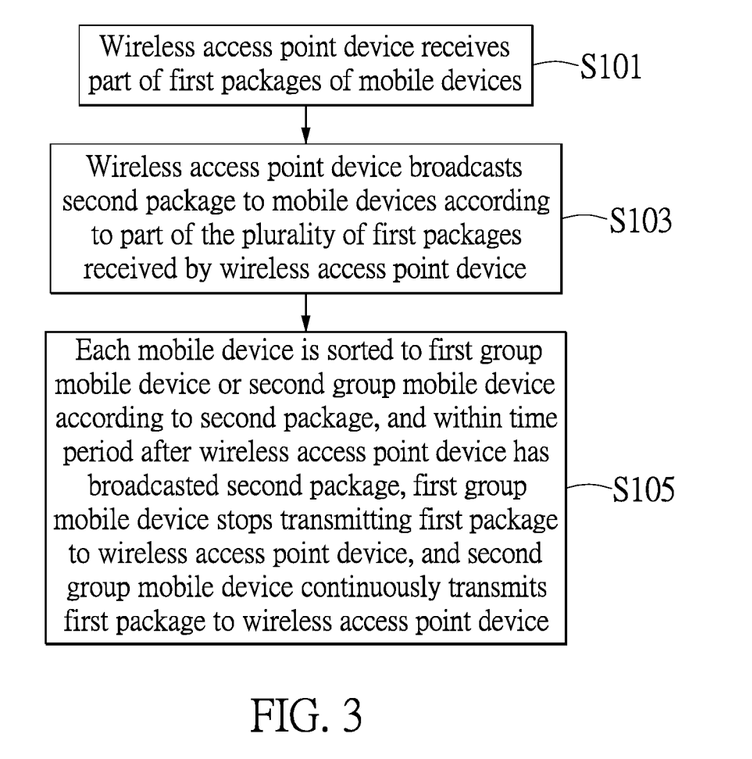
FIG. 3 shows a flowchart of a transmission method for the wireless communication system according to the embodiment of the present disclosure.

Please refer to FIG. 3, in which a transmission method for the wireless communication system according to the embodiment of the present disclosure includes: step S101: the wireless access point device 10 receiving a part of the plurality of first packages of the mobile devices 1, 2, . . . K; step S103: the wireless access point device 10 broadcasting a second package to the mobile devices 1, 2, . . . N according to the part of the plurality of first packages received by the wireless access point device 10; step S105: each mobile device being sorted to a first group mobile device or a second group mobile device according to a second package, and within a time period after the wireless access point device 10 has broadcasted the second package, the first group mobile device stopping transmission of the first package to the wireless access point device 10 and the second group mobile device continuously transmitting the first package to the wireless access point device 10. The second package is a beacon and corresponds to a received information of the first package received by the wireless access point device 10. The first group mobile device represents that the first packages of the mobile devices 1, 2, . . . K have already been received by the wireless access point device 10, and the second group mobile device represents that the first packages of the mobile device K+1, K+2, . . . N have not been received by the wireless access point device 10. Accordingly, the server 12 will generate the second package and transmit the second package to the mobile devices 1, 2, . . . N according to the part of the plurality of first packages received by the wireless access point device 10, and each mobile device will be sorted to the first group mobile device or the second group mobile device according to the second package for different operations. A more detailed description of the steps involved with these operations is set forth as follows.

Figure 4:
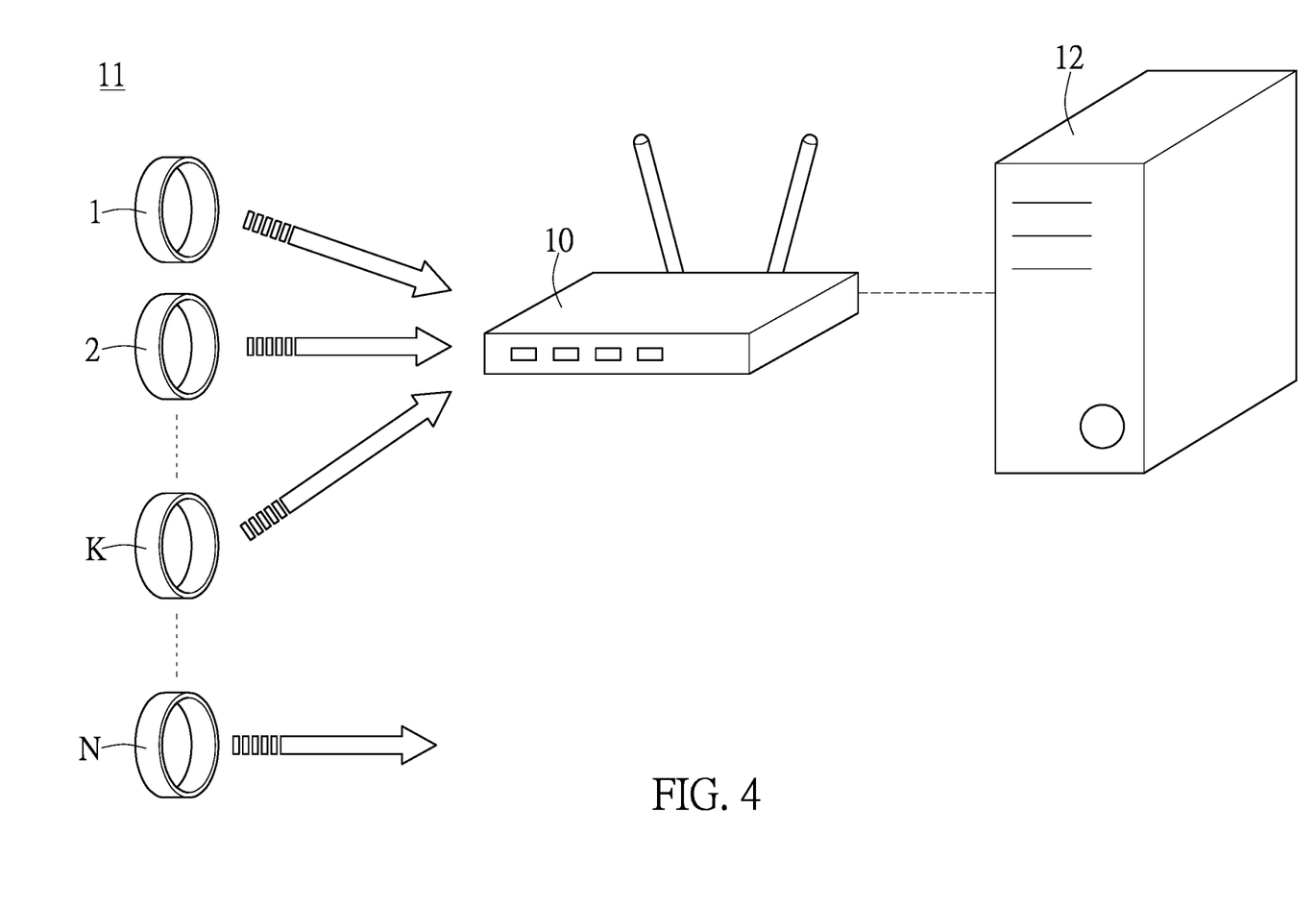
FIG. 4 shows a diagram of a system of a wireless access point device receiving a part of the plurality of first packages according to an embodiment of the present disclosure.

In step S101, please also refer to FIG. 4, in which the mobile devices 1, 2, . . . N simultaneously transmit the plurality of first packages to the wireless access point device 10. Due to limitation from the transmission bandwidth or limited buffer/storage, the wireless access point device 10 may not simultaneously receive all the plurality of first packages transmitted by the mobile devices 1, 2, . . . N, and may receive only a part of the plurality of first packages of the mobile devices 1, 2, . . . K, wherein K is an integer greater than or equal to 1 and smaller than or equal to N.

Figure 5:
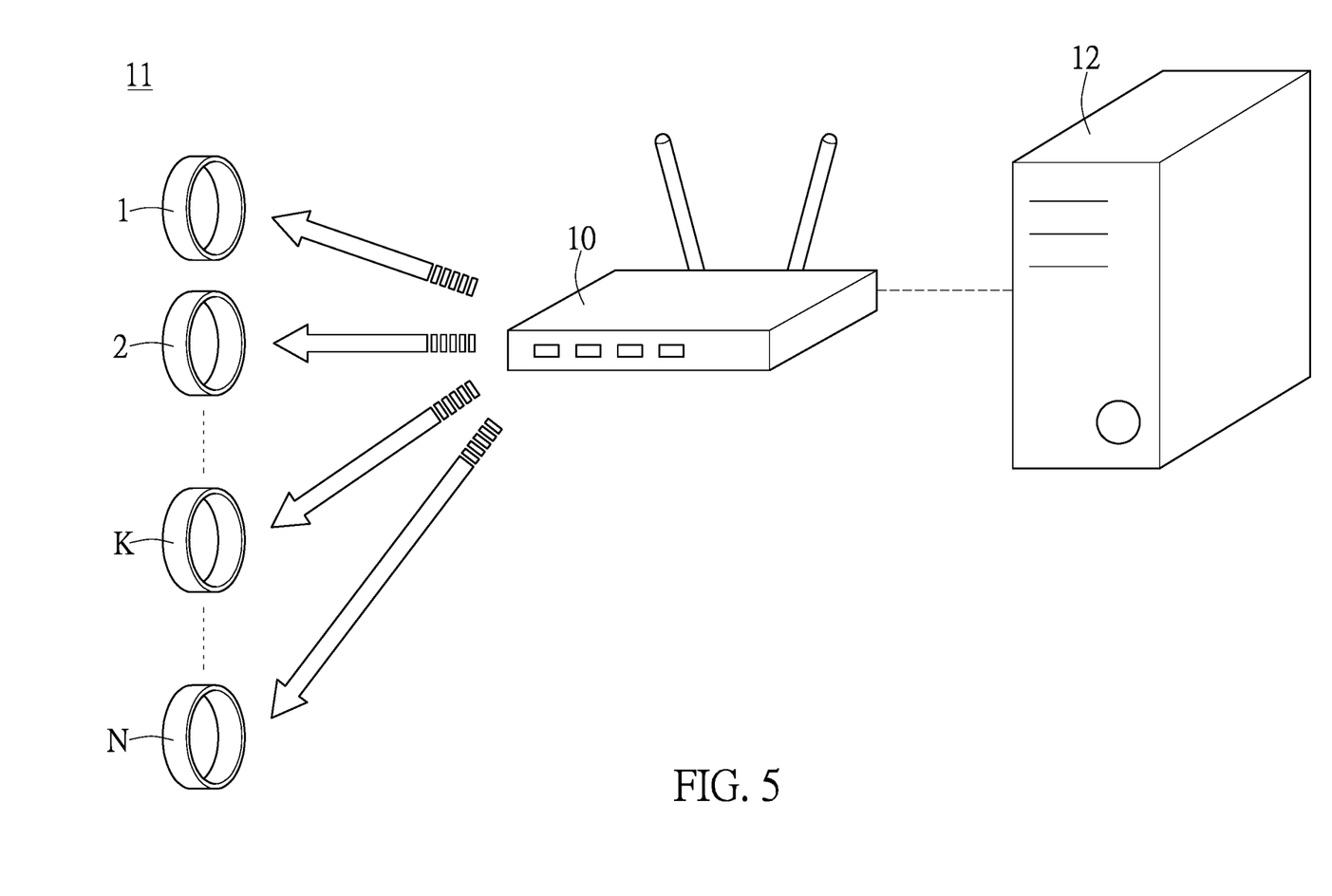
FIG. 5 shows a diagram of a system of a wireless access point device broadcasting a second package according to an embodiment of the present disclosure.

In step S103, please also refer to FIG. 5, in which the server 12 receives the plurality of first packages from the wireless access point device 10, and determines that the wireless access point device 10 has received the plurality of first packages of the mobile devices 1, 2, . . . K, and has not received the plurality of first packages corresponding to the mobile devices K+1, K+2, . . . N. Accordingly, the server 12 will generate the received information corresponding to whether the wireless access point device 10 receives the first package and will output the received information as the second package. Then, the server 12 broadcasts the second package to the mobile devices 1, 2, . . . N by the wireless access point device 10.

Figure 6:
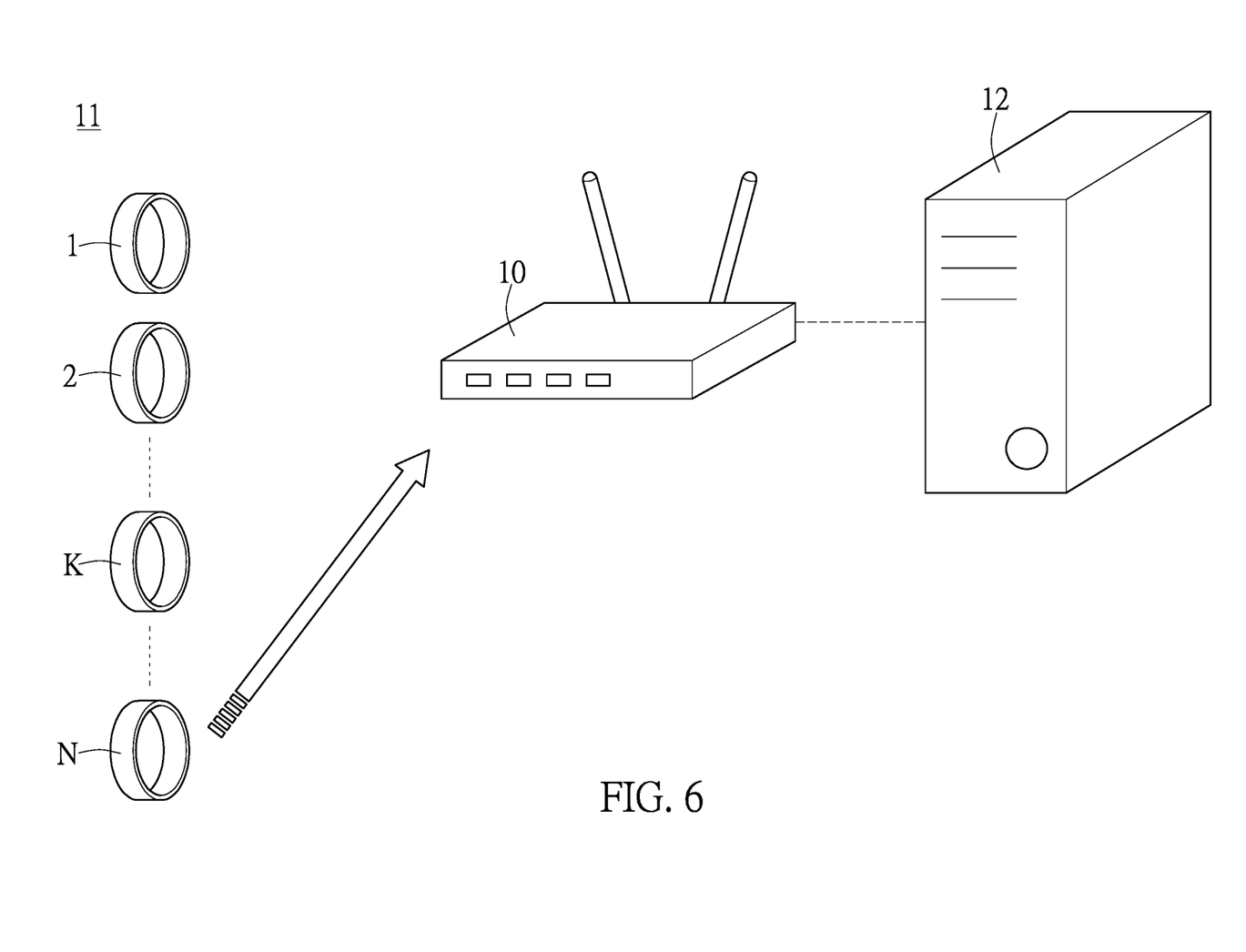
FIG. 6 shows a diagram of a system of a wireless access point device receiving another part of the plurality of first packages according to an embodiment of the present disclosure.

In step S105, please also refer to FIG. 6, in which it may be determined, according to the second package, whether or not the mobile devices 1, 2, . . . N will continue to transmit the first packages to the wireless access point device 10. For example, the second package may inform the mobile devices 1, 2, . . . K (i.e., the first group mobile device) that the first package has been received by the wireless access point device 10, and accordingly, the mobile devices 1, 2, . . . K will stop transmitting the first packages to the wireless access point device 10 within a time period after the second package has been broadcasted. Furthermore, the second package will also inform the mobile device K+1, K+2, . . . N (i.e., the second group mobile device) that the first package has not been received by the wireless access point device 10, and accordingly, the mobile devices K+1, K+2, . . . N will continuously transmit the first packages to the wireless access point device 10 with the same time period after the second package has been broadcasted. It should be noted that, the time period may be adjusted based on different requirements by someone skilled in the relevant technical field, such as 1 second, 2 seconds, or more or less, by which the present disclosure is not limited. In other words, each mobile device in the embodiment may decode relative information in the second package to determine whether the transmitted first package is received by the wireless access point device 10, so as to determine whether the individual first package is continuously transmitted to the wireless access point device 10 within the time period after the second package has been broadcasted.

It should be noted that, the mobile devices 1, 2 . . . N may include a radio frequency circuit to transmit the first packages and receive the second package, or the mobile devices 1, 2 . . . N may include two radio frequency circuits to respectively transmit the first package and receive the second package. The difference is that, the mobile devices 1, 2 . . . N including a radio frequency circuit works with the wireless access point device 10 in a synchronous and time-division manner (transmitting and receiving at different times) to transmit the first package and receive the second package; while the mobile devices 1, 2 . . . N including two radio frequency circuits does not have to work with the wireless access point device 10 in a synchronous and time-division manner (transmitting and receiving simultaneously) or in a time-division manner to transmit the first package and receive the second package.

It should be noted that, if any first package of the mobile devices is not received after the communication system according to the embodiment of the present disclosure performs the above steps S101, S103, S105, steps S101, S103, S105 will then be repeated till the first packages of all mobile devices are received.

Figure 7:
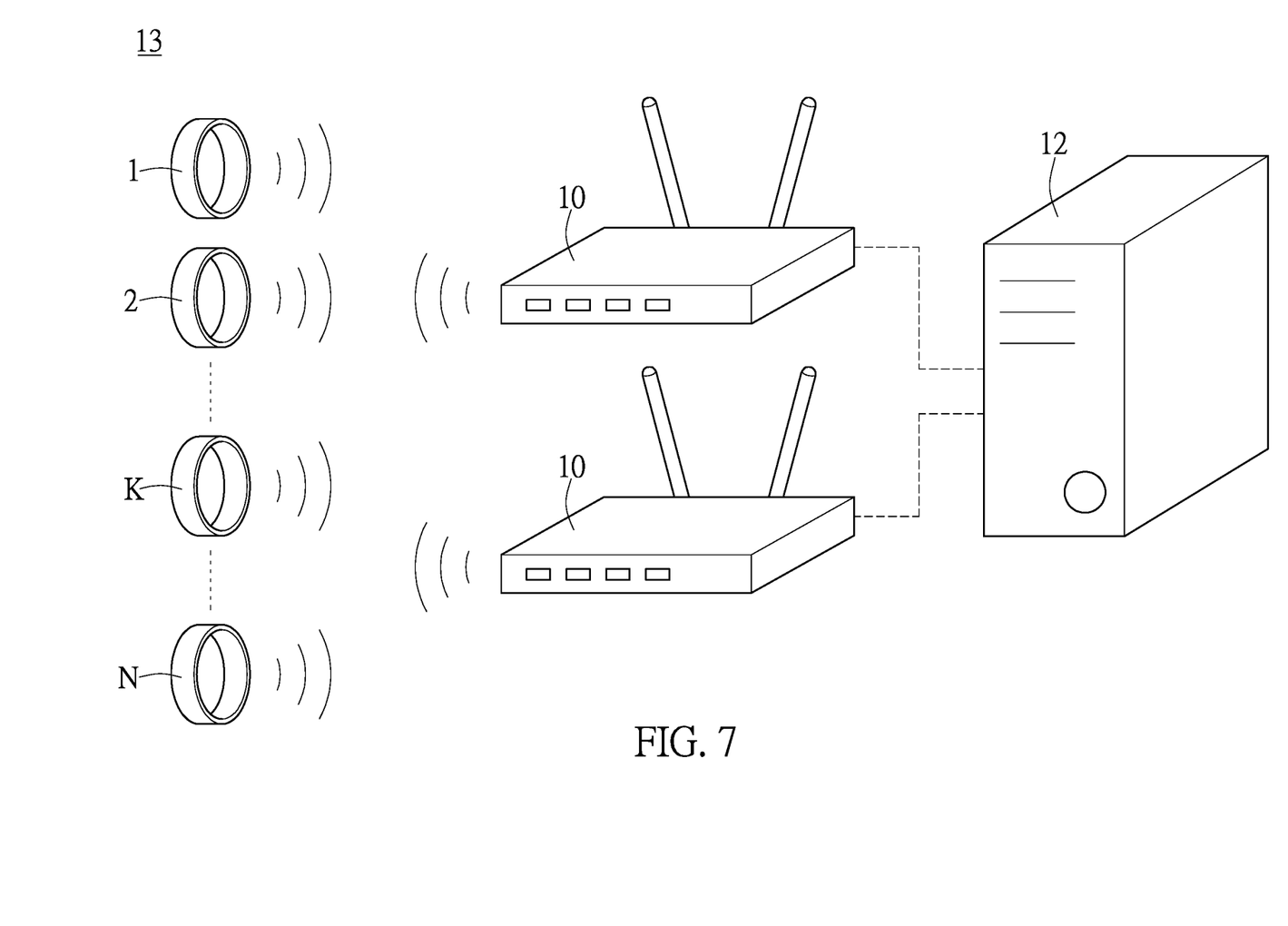
FIG. 7 shows a diagram of a wireless communication system according to another embodiment of the present disclosure.

As shown in FIG. 7, the wireless communication system according to another embodiment of the present disclosure includes the mobile devices 1, 2, . . . N, two wireless access point devices 10 and the server 12. Two wireless access point devices 10 differs from one wireless access point device 10 in that, two wireless access point devices 10 may simultaneously receive part of the plurality of first packages of the mobile devices 1, 2, . . . K, wherein the plurality of first packages of the mobile devices 1, 2, . . . K may be received repeatedly. The server 12 may integrate the received information of two wireless access point devices 10 and correspondingly generate the second package to two wireless access point devices 10. The two wireless access point devices 10 can then broadcast the second package to the mobile devices 1, 2, . . . K. It should be noted that the mentioned embodiment should not be construed as limiting the scope of the present disclosure. The number of the wireless access point devices may be increased based on the system design by someone skilled in the relevant technical field, and the second package transmitted from the server may also be adaptively adjusted/changed according to the number of the wireless access point devices, for example, the decoding information belonging to the wireless access point device may be brought along.

In an example, the mobile devices 1, 2, . . . 90 transmit the plurality of first packages to two wireless access point device 10, one wireless access point device 10 receives the plurality of first packages of the mobile devices 1, 2, . . . 40, and the other wireless access point device 10 receives the plurality of first packages of the mobile devices 30, 31, . . . 70, wherein the two wireless access point devices 10 repeatedly receive the plurality of first packages of the mobile devices 30, 31, . . . 40. Accordingly, the server 12 may adaptively generate the second package according to the plurality of first packages received by the two wireless access point devices 10, and accordingly, the two wireless access point devices 10 may inform the mobile devices 1, 2, . . . 70 to be sorted to the first group mobile devices and inform the mobile device 71, 72, . . . 90 to be sorted to the second group mobile devices. Under this condition, the mobile devices 1, 2, . . . 70 will stop transmitting the plurality of first packages to any one of the two wireless access point devices 10 within a time period after the second package has been broadcasted, and the mobile device 71, 72, . . . 90 will continuously transmit the plurality of first packages to any one of the two wireless access point devices 10.

In summary, the present disclosure provides a transmission method, wireless communication system and computer system for increasing the rate of receiving packages, adaptively distributing the limited transmission resource (such as bandwidth) between the mobile device and wireless access point device to make all position beacons of the mobile devices be transmitted to the server (or a rear end computing center), thus decreasing the instances of beacons being lost in the mobile device, and simultaneously increasing the rate of receiving a plurality of beacons corresponding to a plurality of mobile devices in a particular area.

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. A transmission method for a wireless communication system, the wireless communication system comprising at least one wireless access point device and a plurality of mobile devices, each mobile device correspondingly generates a first package, the transmission method comprising:
  receiving a part of the plurality of first packages of the plurality of mobile devices by the wireless access point device;
  broadcasting a second package to the plurality of mobile devices by the wireless access point device according to the part of the plurality of first packages received by the wireless access point device;
  sorting each mobile device to a first group mobile device or a second group mobile device according to the second package; and
  within a time period after the second package has been broadcasted, stopping the transmission of the first package to the wireless access point device by the first group mobile device and transmitting the first package to the wireless access point device continuously by the second group mobile device;

wherein each of the first packages corresponds to a position information of each of the mobile devices, the second package corresponds to a received information of the first package received by the wireless access point device, the first group mobile device represents that the first package of the mobile device has been received by the wireless access point device, and the second group mobile device represents that the first package of the mobile device has not been received by the wireless access point device.

2. The transmission method of claim 1, wherein the wireless access point device is connected to a server, and the second package is correspondingly generated according to the part of the plurality of first packages received by the wireless access point device, such that the plurality of mobile devices are sorted to the first group mobile device or the second group mobile device.

3. The transmission method of claim 1, wherein each of the first packages and the second package is a beacon.

4. A wireless communication system comprising:
a plurality of mobile devices, each of the mobile devices correspondingly generating a first package; and
at least one wireless access point device receiving a part of the plurality of first packages of the plurality of mobile devices, and broadcasting a second package to the plurality of mobile devices;
wherein each of the mobile devices is sorted to a first group mobile device or a second group mobile device according to the second package, and within a time period after the second package has been broadcasted, the first group mobile device stops transmitting the first package to the wireless access point device and the second group mobile device continuously transmits the first package to the wireless access point device;
wherein each of the first packages corresponds to a position information of each of the mobile device, the second package corresponds to a received information of the first package received by the wireless access point device, the first group mobile device represents that the first package of the mobile device has been received by the wireless access point device, and the second group mobile device represents that the first package of the mobile device has not been received by the wireless access point device.

5. The wireless communication system of claim 4 further comprising a server coupled to the wireless access point device, and the second package is correspondingly generated according to the part of the plurality of first packages received by the wireless access point device, such that the plurality of mobile devices are sorted to the first group mobile device or the second group mobile device.

6. The wireless communication system of claim 4, wherein each of the first package and the second package is a beacon.

7. A computer system coupled to a wireless communication system, the wireless communication system comprising at least one wireless access point device and a plurality of mobile devices, each mobile device correspondingly generating a first package, the computer system comprising:
a central processing unit; and
a storage device coupled to the central processing unit to store a code, the code controlling the central processing unit to perform a transmission method for the wireless communication system, the transmission method comprising:
receiving a part of the plurality of first packages of the plurality of mobile devices by the wireless access point device;
broadcasting a second package to the plurality of mobile devices by the wireless access point device according to the part of the plurality of first packages received by the wireless access point device;
sorting each mobile device to a first group mobile device or a second group mobile device according to the second package; and
within a time period after the second package has been broadcasted, stopping transmission of the first package to the wireless access point device by the first group mobile device and transmitting the first package to the wireless access point device continuously by the second group mobile device;
wherein each of the first packages corresponds to a position information of each of the mobile devices, the second package corresponds to a received information of the first package received by the wireless access point device, the first group mobile device represents that the first package of the mobile device has been received by the wireless access point device, and the second group mobile device represents that the first package of the mobile device has not been received by the wireless access point device.

8. The computer system of claim 7, wherein each of the first package and the second package is a beacon.

* * * * *